Oct. 17, 1944.  A. BOOR  2,360,755
SHOCK ABSORBER
Filed July 20, 1942
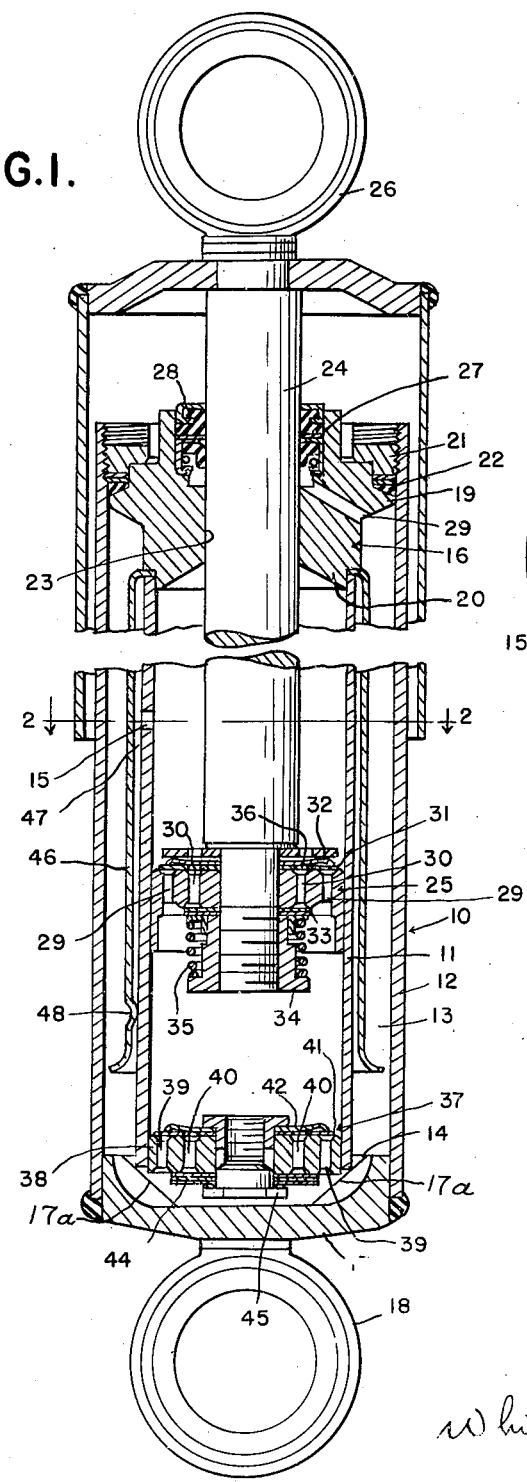
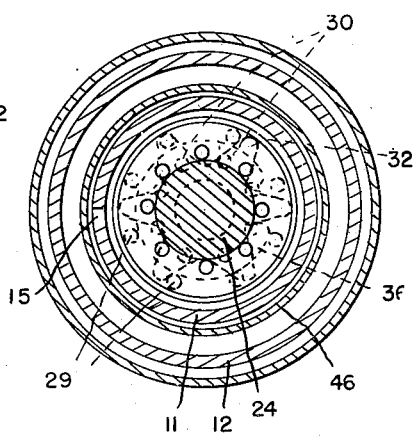
*INVENTOR.*
ARTHUR BOOR
BY
Whittemore Hulbert & Belknap
ATTORNEYS Patented Oct. 17, 1944

2,360,755

UNITED STATES PATENT OFFICE 2,360,755

SHOCK ABSORBER

Arthur Boor, Toledo, Ohio, assignor to Monroe Auto Equipment Company, Monroe, Mich., a corporation of Michigan Application July 20, 1942, Serial No. 451,597

13 Claims. (Cl. 188—88)

This invention relates generally to shock absorbers and refers more particularly to direct acting hydraulic shock absorbers of the type having a cylinder operatively connected to one part of a pair of relatively movable parts and having a piston reciprocably mounted in the cylinder and operatively connected to the other part.

One of the principal objects of this invention is to provide a shock absorber of the above general type characterized in that it differentially controls relative movement of the parts in one direction. In accordance with this invention, the shock absorber has a moderate retarding effect on the parts as the latter are relatively moved throughout a predetermined normal range of travel in one direction and has a relatively greater retarding effect as relative movement of the parts is continued in the same direction beyond the range set forth above.

Another object of this invention is to provide a direct acting tubular hydraulic shock absorber having a reserve chamber communicating with the cylinder intermediate the ends of the piston stroke in such a manner that fluid from the cylinder escapes relatively freely into the reserve chamber as the piston is moved in a direction toward the point of communication aforesaid.

Still another object of this invention is to provide a shock absorber of the type set forth in the preceding paragraph having means for substantially restricting displacement of fluid from the portion of the cylinder in advance of the piston as the latter moves beyond the point of communication in the same direction set forth in the above paragraph. Thus, two definite stages of shock absorber control are provided as the parts are relatively moved in one direction and this is advantageous in cases where it is desired to delay the maximum damping action until the final travel of the parts.

A further object of this invention is to provide the above type of shock absorber with means enabling relatively free flow of fluid through the piston as the latter is moved in a direction opposite the one previously set forth and to retard this latter movement by providing a pressure operated valve controlled port between the reserve chamber and cylinder.

In additon to the foregoing, this invention contemplates maintaining a column of liquid in sealing relation to the port intermediate the ends of the cylinder. As a result, air in the reserve chamber 13 is prevented from passing into the cylinder 11, and fluid that is forced from the cylinder 11 through port 15 is prevented from being discharged directly at high velocity into the reserve chamber.

The foregoing, as well as other objects, will be made more apparent as this description proceeds, especially when considered in connection with the accompanying drawing, wherein:

Figure 1 is a longitudinal sectional view through a shock absorber constructed in accordance with this invention; and Figure 2 is a cross sectional view taken on the line 2—2 of Figure 1.

In Figure 1 of the drawing I have illustrated a direct acting tubular type of hydraulic shock absorber 10 having a cylinder 11 and having a tube 12 surrounding the cylinder in concentric relation thereto. The internal diameter of the tube 12 is substantially greater than the external diameter of the cylinder 11 and cooperates with the latter to form an annular reserve chamber 13. The reserve chamber communicates with the lower end of the cylinder through the medium of ports 14 and communicates with the cylinder intermediate the ends of the latter through the medium of a constantly open port 15.

The upper end of the cylinder is closed by a head 16 and the lower end of the tube 12 or reserve chamber 13 is closed by a cap 17 having circumferentially spaced ribs 17a engaging and forming seats for the lower end of the cylinder 11 and forming side walls for the ports 14. The cap 17 is welded or otherwise fixedly secured to the lower end of the tube 12 and is adapted to be connected to one part of a pair of relatively movable parts by means of a fixture 18. For the purpose of illustration, it will be assumed that the fixture is pivotally connected in the usual manner to the unsprung assembly of a vehicle.

The head 16 is provided with an enlarged portion 19 of sufficient diameter to engage the inner surface of the tube 12 adjacent the upper end of the latter and is further provided with a reduced portion 20 which is suitably secured to the upper end of the cylinder 11. The head 16 is clamped in place by means of a ring 21 which is threadedly mounted in the upper end of the tube 12 above the enlargement 19 and cooperates with this enlargement to clamp an annular seal 22 in place. The ring 21 also cooperates with the ribs 17a to prevent the tube 12 from moving upwardly with respect to the cylinder 11. The seal 22 coacts with the enlargement 19 to close the upper end of the reserve chamber 13 and to prevent escape of fluid from the reserve chamber.

It will also be noted from Figure 1 that the head 16 is formed with the centrally arranged bore 23 of sufficient diameter to slidably receive a piston rod 24 having the lower end operatively connected to a piston 25 which has a sliding engagement with the inner surface of the cylinder 11. The upper end of the piston rod 24 is provided with a fixture 26 adapted to be connected to the other of the relatively movable parts aforesaid. In the present instance, the fixture 26 is of the type which enables the same to be readily pivotally connected to the sprung assembly of a suitable vehicle.

In order to prevent fluid in the cylinder from escaping along the piston rod 24, the upper end of the head 16 is counterbored as at 27 and a seal 28 is secured in the counterbored portion in frictional engagement with the piston rod 24. The seal 28 is assisted in the above function by means of a port 29 formed in the head 16 and establishing communication between the reserve chamber 13 and the counterbore 27 at a point below the seal 28.

In accordance with the present invention, fluid in the cylinder 11 is permitted to flow in opposite directions through the piston 25 as the latter reciprocates in the cylinder and the rate of flow of the fluid in opposite directions through the piston is differentially controlled. In detail, relatively free flow of fluid through the piston is permitted when the piston is moved in a downward direction in the cylinder and more restricted flow of fluid through the piston is provided when the latter is moved in an upward direction in the cylinder.

For accomplishing the above results, the piston has two sets of passages 29 and 30, respectively, therethrough. The outer passages 29 are normally closed by a disc valve 31 clamped against the upper side of the piston and normally held in its closed position with respect to the ports 29 by means of a light spring 32. This valve is adapted to open upon downward movement of the piston to enable fluid to flow relatively freely from the portion of the cylinder below the piston to the portion of the cylinder above the piston. The inner ports 30 are normally closed by a laminated disc valve 33 centrally clamped to the bottom surface of the piston by means of a fastener element 34 threaded on the lower end of the piston rod 24. The peripheral portions of the laminated disc valve are seated against the lower ends of the ports 30 by means of a coil spring 35 having the lower end abutting a flange on the fastener element 34 and having the opposite end acting on the disc valve 33. It will, of course, be understood that the disc valve 31 is apertured as at 36 to enable fluid in the cylinder above the piston to flow through the ports 30 as the piston moves in an upward direction. However, considerably greater pressure is required to open the disc valve 33 and, therefore, the flow of fluid in a downward direction through the piston is restricted to a greater extent than the flow of fluid in an upward direction through the piston.

Due to the presence of the piston rod 24 in the portion of the cylinder above the piston, it is necessary to provide for the transfer of fluid between the cylinder 11 and the reserve chamber 13. This is accomplished by the ports 14 and, in the present instance, the transfer of fluid through the ports is controlled by a compound valve 37. The valve 37 is secured in the lower end of the cylinder 11 and comprises a plate 38 having two sets of ports 39 and 40 therethrough. The outer ports 39 are normally closed by a disc valve 41 clamped at its center on the top surface of the plate and normally urged to its closed position by a light spring 42. The arrangement is such that when the piston is moved in an upward direction, fluid is permitted to flow relatively freely from the reserve chamber to the cylinder in order to compensate for the increased volume of the cylinder resulting from the displacement of the piston rod 24.

The inner ports 40 are closed by a laminated disc valve 44 clamped at its center against the bottom surface of the plate 38 by means of a fastener element 45. The valve 44 is opened by the pressure rise in the lower end of the cylinder as the piston is moved in a downward direction and the pressure required to open the valve 44 is substantially greater than the pressure required to open the valve 41. It follows from the above construction that the laminated disc valve 44 functions to restrict the escape of the fluid trapped in the cylinder 11 below the piston 25 during the final portion of its movement in a downward direction and, as a consequence, exercises a substantial control during this final phase of the operation.

*Operation*

Assuming that both the cylinder 11 and the reserve chamber 13 are filled or are substantially filled with fluid, it will be noted that as the piston 25 moves in an upward direction from the position thereof shown in Figure 1, the volume of the portion of the cylinder 11 above the piston diminishes and the pressure in this portion of the cylinder tends to increase. However, the fluid in the cylinder 11 above the piston 25 escapes into the reserve chamber 13 through the constantly open port 15 and the rate of pressure rise in the cylinder above the piston depends upon the size of the port 15 and the strength of the valve 33. Under normal operating conditions it is desired to maintain the valve 33 closed until the piston closes or moves beyond the port 15 and, accordingly, the port 15 is of sufficient size to permit fluid to escape at such a rate that under ordinary circumstances only moderate pressure is built up in the cylinder above the piston during initial upward movement thereof. It should be noted, however, that the rate of escape of fluid through the port 15 may be varied to suit different conditions by merely altering the size of the port 15 and this invention contemplates such an arrangement.

In any event, it follows from the above that the opening 15 may be of such a size to permit relatively free upward movement of the piston until the piston is moved beyond the port 15 or until the latter is closed by the piston. When this phase of the operation is approached, considerable resistance is offered to continued upward movement of the piston because the valve 33 requires substantial pressure to open the same. Thus, during the normal stroke of the shock absorber in one direction, only moderate control is exercised by the shock absorber on the relatively movable parts to which it is attached and the more severe control is delayed until the final portion of the stroke where damping of the parts becomes of considerable importance in order to take care of abnormal conditions. It is also pointed out at this time that as the piston 25 moves upwardly throughout the final portion of its stroke, the valve 41 is opened permitting fluid to flow from the reserve chamber 13 to the portion of the cylinder below the piston. The valve

41 is opened by the suction created in the lower portion of the cylinder as the volume of the latter is increased by an amount equal to the displacement of the piston rod 24.

It will, of course, be understood that as the piston 25 moves downwardly in the cylinder 11 from the upper end of the latter, fluid escapes through the port 15 until this port is closed by the piston and then fluid passes upwardly through the ports 29 past the valve 31. When the piston moves downwardly beyond the port 15, fluid is also drawn into the upper portion of the cylinder 11 through the port 15 and this operation assists in maintaining the shock absorber loaded.

As the piston 25 moves downwardly in the cylinder 11, the pressure of the fluid in the lower portion of the cylinder below the piston ultimately becomes sufficient to open the disc valve 44 and enable the excess fluid in the lower end of the cylinder to escape through passages 40 and ports 14 into the reserve chamber 13. Thus the construction insures damping downward movement of the piston throughout the final portion of its stroke.

With a construction of the above type, it is highly desirable to prevent air in the reserve chamber 13 passing through port 15 into the cylinder 11, and to prevent the fluid that is forced from the cylinder 11 through port 15 from being discharged directly at high velocity into the reserve chamber. Thus, the cylinder 11 is surrounded by a sleeve 46 having an internal diameter slightly greater than the external diameter of the cylinder and cooperating with the exterior surface of the cylinder to form a relatively narrow space 47 for the fluid. The upper end of the sleeve is suitably secured to the upper end of the cylinder by the head 16 and the lower end of the sleeve is engaged at circumferentially spaced points 48 with the cylinder adjacent the lower end of the latter. The arrangement is such that fluid is maintained in the relatively small annular space 47 and forms a column of fluid in sealing relation to the port 15.

What I claim as my invention is:

1. A direct acting hydraulic shock absorber having a cylinder adapted to contain a fluid, a piston reciprocably mounted in the cylinder, a reserve chamber having a constantly open port communicating with the cylinder intermediate the ends of the piston stroke permitting escape of fluid from the cylinder as the piston is moved in a direction toward the port, means for maintaining fluid in sealing relation to said port, and means including a valve controlled port through said piston adapted to retard continued movement of the piston in said direction after it passes the first mentioned port.

2. A direct acting hydraulic shock absorber having a cylinder adapted to contain a liquid, a piston reciprocably mounted in the cylinder, a reserve chamber having a port communicating with the interior of the cylinder intermediate the ends of the piston stroke permitting relatively free flow of liquid from the portion of the cylinder in advance of the piston as the piston is moved in a direction toward the port, means in the reserve chamber for maintaining a column of fluid in sealing relation to the port, and a valve controlled port through said piston responsive to continued movement of the piston in the direction aforesaid beyond the port to displace liquid in advance of the piston at a substantially reduced rate.

3. A direct acting hydraulic shock absorber having a cylinder adapted to contain a fluid, a piston reciprocably mounted in the cylinder, a reserve chamber having a port communicating with the interior of the cylinder intermediate the ends of the piston stroke permitting relatively free flow of fluid from the portion of the cylinder in advance of the piston as the latter is moved in a direction toward said port, means for maintaining fluid in sealing relation to said port, a second port establishing communication between the reserve chamber and cylinder at one end of the piston stroke permitting fluid to flow from the cylinder into the reserve chamber as the piston is moved in a direction opposite the direction of movement aforesaid, and a pressure operated valve normally closing said second port.

4. A direct action hydraulic shock absorber having a cylinder adapted to contain a fluid, a piston reciprocably mounted in the cylinder, a reserve chamber having a port communicating with the interior of the cylinder intermediate the ends of the piston stroke permitting relatively free flow of fluid from the portion of the cylinder in advance of the piston as the latter is moved in a direction toward said port, means on the cylinder for maintaining a column of fluid in sealing relation to said port, valve controlled ports through the piston responsive to continued movement of the piston in the direction aforesaid beyond said port to provide for restricted flow of fluid through said piston, additional valve controlled ports responsive to movement of the piston in the opposite direction to permit relatively free flow of fluid through said piston, and means providing for restricted flow of fluid from the cylinder to the reserve chamber as said piston continues to move in said opposite direction.

5. A direct acting hydraulic shock absorber having a cylinder adapted to contain a liquid, a piston reciprocably mounted in the cylinder, a tubular member surrounding the cylinder and cooperating with the latter to form a reserve chamber, a port establishing communication between the reserve chamber and cylinder at a point intermediate the stroke of the piston permitting relatively free flow of fluid from the cylinder into the reserve chamber as the piston moves in a direction toward the port, a sleeve surrounding the ported portion of the cylinder in spaced relation thereto to insure maintaining a column of liquid in sealing relation to said port, and means responsive to continued movement of the piston in the direction aforesaid beyond the port to provide for restricted flow of fluid through the piston.

6. A direct acting hydraulic shock absorber having a cylinder adapted to contain a liquid, a piston reciprocably mounted in the cylinder, a reserve chamber having a port communicating with the interior of the cylinder intermediate the ends of the piston stroke permitting relatively free flow of liquid from the portion of the cylinder in advance of the piston as the piston is moved in a direction toward the port, means within said reserve chamber cooperating with said cylinder to maintain fluid in sealing relation to said port, and means including a valve controlled port adapted to retard continued movement of the piston in said direction after it passes the first mentioned port.

7. A direct acting hydraulic shock absorber having a cylinder adapted to contain a liquid, a piston reciprocably mounted in the cylinder, a tubular member surrounding the cylinder and cooperating with the latter to form a reserve chamber, a port establishing communication between the reserve chamber and cylinder at a point intermediate the stroke of the piston permitting relatively free flow of fluid from the cylinder into the reserve chamber as the piston moves in a direction toward the port, means on the cylinder in spaced relation thereto for maintaining a column of liquid in sealing relation to said port, and means including a valve controlled port adapted to retard continued movement of the piston in said direction after it passes the first mentioned port.

8. A direct acting hydraulic shock absorber having a cylinder adapted to contain a liquid, a piston reciprocably mounted in the cylinder, a tubular member surrounding the cylinder and cooperating with the latter to form a reserve chamber, a port establishing communication between the reserve chamber and cylinder at a point intermediate the stroke of the piston permitting relatively free flow of fluid from the cylinder into the reserve chamber as the piston moves in a direction toward the port, means on the cylinder for maintaining a column of liquid in sealing relation to said port, and means including a valve controlled port adapted to retard continued movement of the piston in said direction after it passes the first mentioned port.

9. A direct acting hydraulic shock absorber having a cylinder adapted to contain a fluid, a piston reciprocably mounted in the cylinder, a reserve chamber having a port communicating with the interior of the cylinder intermediate the ends of the piston stroke permitting relatively free flow of fluid from the portion of the cylinder in advance of the piston as the latter is moved in a direction toward said port, means including a valve controlled port adapted to retard continued movement of the piston in said direction after it passes the first mentioned port, means for maintaining fluid in sealing relation to said port, and means providing for restricted flow of fluid from one end of the cylinder into the reserve chamber as the piston is moved in a direction opposite the direction of movement aforesaid.

10. A direct acting hydraulic shock absorber having a cylinder adapted to contain a liquid, a piston reciprocably mounted in the cylinder, a tubular member surrounding the cylinder and cooperating with the latter to form a reserve chamber, a port establishing communication between the reserve chamber and cylinder at a point intermediate the stroke of the piston permitting relatively free flow of fluid from the cylinder into the reserve chamber as the piston moves in a direction toward the port, means including a valve controlled passage adapted to retard continued movement of the piston in said direction after it passes said port, and a sleeve surrounding the ported portion of the cylinder in spaced relation thereto to insure maintaining a column of liquid in sealing relation to said port.

11. A direct acting hydraulic shock absorber having a cylinder adapted to contain a fluid, a piston reciprocably mounted in said cylinder and having a fluid passage therethrough, a reserve chamber having a constantly open port in direct communication with said cylinder intermediate the ends of the piston stroke and permitting escape of fluid from said cylinder to said reserve chamber as the piston is moved in a direction toward said open port, means on the cylinder for maintaining fluid in sealing relation to said port, and means including a valve carried by the piston and operable to close the passage therethrough while the piston is moved toward said open port but yieldable when the piston reaches or moves beyond said open port to retard continued movement of the piston in said direction.

12. A direct acting hydraulic shock absorber having a cylinder adapted to contain a fluid, a piston reciprocably mounted in said cylinder and having a fluid passage therethrough, a reserve chamber having a constantly open port in direct communication with said cylinder intermediate the ends of the piston stroke and permitting escape of fluid from said cylinder to said reserve chamber as the piston is moved in a direction toward said open port, a sleeve on the cylinder for maintaining fluid in sealing relation to said port, and means including a valve carried by the piston and operable to close the passage therethrough while the piston is moved toward said open port but operable when the piston reaches or moves beyond said open port to control continued movement of said piston in said direction.

13. A direct acting hydraulic shock absorber having substantially concentrically arranged chambers, one being a cylinder, the other being a reserve chamber, the cylinder being provided substantially midway its ends with a constantly open port opening directly into the reserve chamber and permitting hydraulic medium to flow from one chamber to the other, a piston reciprocably mounted in the cylinder and adapted during reciprocating movement thereof to alternately cover and uncover said open port, said piston having means operable when the piston covers said port during movement of the piston in one direction to resist continued movement of the piston in said direction, and means substantially concentric with the cylinder for maintaining hydraulic medium in sealing relation to said port regardless of the position of the piston relative thereto.

ARTHUR BOOR.